United States Patent
Jung et al.

(10) Patent No.: US 8,290,509 B2
(45) Date of Patent: Oct. 16, 2012

(54) DEACTIVATION SYSTEM AND METHOD FOR A TRANSFERABLE DEVICE

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); Michael L. Moskowitz, Kirkland, WA (US); John D. Rinaldo, Jr., Bellevue, WA (US); Clarence T. Tegreene, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 192 days.

(21) Appl. No.: 12/657,286

(22) Filed: Jan. 14, 2010

(65) Prior Publication Data
US 2010/0325411 A1   Dec. 23, 2010

Related U.S. Application Data

(63) Continuation-in-part of application No. 11/474,074, filed on Jun. 23, 2006.

(51) Int. Cl.
*H04W 4/02* (2009.01)
*H04W 24/00* (2009.01)
(52) U.S. Cl. .............. 455/456.1; 455/569.2; 455/441
(58) Field of Classification Search .............. None
See application file for complete search history.

(56) References Cited

U.S. PATENT DOCUMENTS

| | | | |
|---|---|---|---|
| 6,081,893 A | 6/2000 | Grawrock et al. | |
| 6,339,828 B1 | 1/2002 | Grawrock et al. | |
| 6,359,661 B1 | 3/2002 | Nickum | |
| 6,408,389 B2 | 6/2002 | Grawrock et al. | |
| 6,748,543 B1 | 6/2004 | Vilhuber | |
| 6,928,547 B2 | 8/2005 | Brown et al. | |
| 6,981,042 B1 | 12/2005 | Rey | |
| 7,088,988 B2 | 8/2006 | Kelkar et al. | |
| 7,266,371 B1 | 9/2007 | Amin et al. | |
| 7,302,272 B2 | 11/2007 | Ackley | |
| 7,433,676 B2 | 10/2008 | Kobayashi et al. | |
| 7,603,108 B2 | 10/2009 | Sparks et al. | |
| 8,014,795 B2 * | 9/2011 | Lipovski | 455/456.4 |
| 8,145,199 B2 * | 3/2012 | Tadayon et al. | 455/418 |
| 2002/0022474 A1 | 2/2002 | Blom et al. | |
| 2004/0043763 A1 | 3/2004 | Minear et al. | |
| 2004/0082322 A1 | 4/2004 | Tani | |
| 2004/0110494 A1 | 6/2004 | Cohen et al. | |
| 2004/0117786 A1 | 6/2004 | Kellerman et al. | |
| 2004/0132438 A1 | 7/2004 | White | |
| 2004/0132449 A1 | 7/2004 | Kowarsch | |
| 2004/0132480 A1 | 7/2004 | Parker et al. | |
| 2004/0261097 A1 | 12/2004 | Hanks | |
| 2005/0266825 A1 | 12/2005 | Clayton | |
| 2006/0009265 A1 | 1/2006 | Clapper | |
| 2006/0075230 A1 | 4/2006 | Baird, III et al. | |
| 2006/0101521 A1 | 5/2006 | Rabinovitch | |
| 2006/0117010 A1 | 6/2006 | Hakala | |
| 2007/0099609 A1 | 5/2007 | Cai | |
| 2007/0202859 A1 | 8/2007 | Ward | |
| 2007/0245026 A1 | 10/2007 | Martin et al. | |
| 2007/0264974 A1 | 11/2007 | Frank et al. | |
| 2007/0264981 A1 | 11/2007 | Miller | |
| 2008/0045179 A1 | 2/2008 | Bekanich et al. | |

(Continued)

*Primary Examiner* — Marcos Batista
*Assistant Examiner* — Frank Donado

(57) ABSTRACT

Methods and systems for deactivation of one or more applications operating on a transferable device are provided.

59 Claims, 12 Drawing Sheets

U.S. PATENT DOCUMENTS

| | | | |
|---|---|---|---|
| 2010/0087194 A1* | 4/2010 | MacNaughtan et al. | 455/435.2 |
| 2011/0021234 A1* | 1/2011 | Tibbitts et al. | 455/517 |
| 2011/0098058 A1* | 4/2011 | Mahalingam | 455/456.1 |
| 2011/0105097 A1* | 5/2011 | Tadayon et al. | 455/418 |
| 2011/0136480 A1* | 6/2011 | Osann, Jr. | 455/418 |
| 2011/0171943 A1* | 7/2011 | Raviv | 455/418 |
| 2011/0195699 A1* | 8/2011 | Tadayon et al. | 455/418 |
| 2011/0212737 A1* | 9/2011 | Isidore | 455/466 |
| 2011/0294520 A1* | 12/2011 | Zhou et al. | 455/456.1 |
| 2012/0064920 A1* | 3/2012 | Shaw | 455/456.4 |

* cited by examiner

DEACTIVATION SYSTEM AND METHOD FOR A TRANSFERABLE DEVICE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/474,074, entitled TRANSFERABLE DEVICE WITH ALTERABLE USE-AGE FUNCTIONALITY, naming EDWARD KY JUNG, ROYCE A. LEVIEN, MARK A. MALAMUD, JOHN D. RINALDO, JR., LOWELL L. WOOD, JR., CLARENCE T. TEGREENE as inventors, filed 23, Jun. 2006, which is currently co-pending, or is an application of which a currently co-pending application is entitled to the benefit of the filing date. The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

Methods and systems for are provided for deactivating a transferable device.

In one aspect, a transferable device tangibly embodying a program of instructions executable by the transferable device to perform method steps includes but is not limited to instantiating a user profile ; and deactivating one or more visually interactive applications on the transferable device upon receiving a deactivation cue contingent on a discrete probability calculation in accordance with the user profile. In addition to the foregoing, other method aspects are described in the claims, drawings, and text forming a part of the present disclosure.

In another aspect, a method includes but is not limited to transmitting via a computing device to a transferable device one or more instructions to deactivate one or more applications operating on the transferable device in accordance with a user profile, the one or more instructions contingently transmitted based on a determination that the transferable device has exceeded a maximum velocity; and receiving a confirmation from the transferable device that the one or more applications have been deactivated. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In another aspect a system includes but is not limited to means for transmitting via a computing device to a transferable device one or more instructions to deactivate one or more applications operating on the transferable device in accordance with a user profile, the one or more instructions contingently transmitted based on a determination that the transferable device has exceeded a maximum velocity; and means for receiving a confirmation from the transferable device that the one or more applications have been deactivated. In addition to the foregoing, other method aspects are described in the claims, drawings, and text forming a part of the present disclosure.

In another aspect a system includes but is not limited to circuitry for transmitting via a computing device to a transferable device one or more instructions to deactivate one or more applications operating on the transferable device in accordance with a user profile, the one or more instructions contingently transmitted based on a determination that the transferable device has exceeded a maximum velocity; and circuitry for receiving a confirmation from the transferable device that the one or more applications have been deactivated. In addition to the foregoing, other aspects are described in the claims, drawings, and text forming a part of the present disclosure.

In another aspect a computer program product includes but is not limited to one more signal-bearing mediums bearing one or more instructions for transmitting via a computing device to a transferable device one or more instructions to deactivate one or more applications operating on the transferable device in accordance with a user profile, the one or more instructions contingently transmitted based on a determination that the transferable device has exceeded a maximum velocity; and one or more instructions for receiving a confirmation from the transferable device that the one or more applications have been deactivated.

In another aspect a system includes but is not limited to one or more computing devices; and one or more instructions that when executed on the one or more computing devices cause the one or more computing devices to: instantiate a user profile on a transferable device; and deactivate one or more visually interactive applications on the transferable device upon receiving a deactivation cue contingent on a discrete probability calculation in accordance with the user profile.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1:
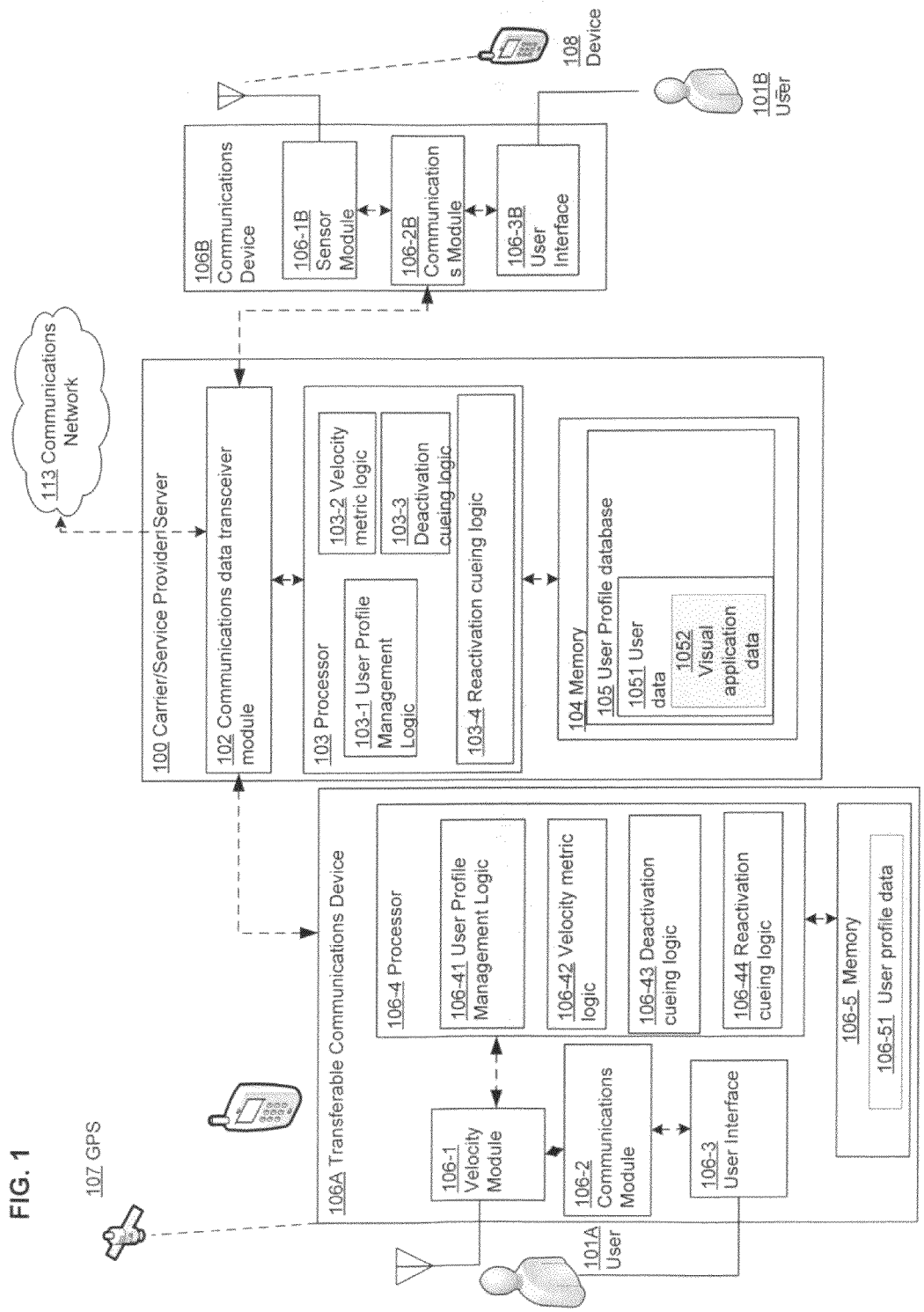
FIG. 1 shows a high-level block diagram of a system for deactivating a transferable device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example environment in which one or more technologies may be implemented. A system and method for deactivating of one or more applications operating on a transferable communications device can include a carrier/service provider server 100, a transferable communications device 106A associated with a user profile activated for a user 101A (e.g. a user profile for the user 101A that can be activated on transferable communications device 106A). The user profile can be activated by either a user of the transferable device, an instruction from a carrier/service provider server 100, a second user 101B of either a second transferable device or of a computer system with access to carrier/service provider server 100. In an embodiment, second user 101B can have control privileges for one or more user profiles.

The user 101A and user 101B may be shown/described herein as a single illustrated figure, however, those skilled in the art will appreciate that any user or plurality of users may be representative of a human user, a robotic user (e.g., computational entity), and/or substantially any combination thereof (e.g., a user may be assisted by one or more robotic agents).

The carrier/service provider server 100 can be an integrated or distributed server system associated with one or more communications networks. Numerous types of communications networks 113 may be used. Examples of communications networks may include, but are not limited to, a voice over internet protocol (VoIP) network (e.g. networks maintained by Vonage®, Verizon®, Sprint®), a cellular network (e.g. networks maintained by Verizon®, Sprint®, AT&T®, T-Mobile®), a text messaging network (e.g. an SMS system in GSM), and an e-mail system (e.g. an IMAP, POP3, SMTP, and/or HTTP e-mail server), and the like. The one or more communications networks can also include a satellite communications network, such as those supported by the Iridium® network.

The carrier/service provider server 100 may include a communications data transceiver module 102. Numerous types of communications data transceiver modules 102 may be used. Examples of communications data transceiver modules 102 may include, but are not limited to, a cellular transceiver, a satellite transceiver and a network portal (e.g. a modem linked to an internet service provider).

The carrier/service provider server 100 may include a processor 103. Numerous types of processors 103 may be used (e.g. general purpose processors such those marketed by Intel® and AMD, application specific integrated circuits, and the like). For example, the processor 103 may include, but is not limited to, one or more logic blocks capable of performing one or more computational functions, such as user-profile management logic 103-1, velocity metric logic 103-2, deactivation cueing logic 103-3 and/or reactivation cueing logic 103-4.

The carrier/service provider server 100 may include a memory 104. Numerous types of memory 104 may be used (e.g. RAM, ROM, flash memory, and the like). The memory 104 may include, but is not limited to, a user-profile database 105 including user profile data for one or more users (e.g. user profile database 105 associated with the user 101A and may include user data associated with other users, which will be appreciated by those of skill in the art with the benefit of this application. A user profile database for a user may include one or more fields holding identifiers. For example, the user profile database 105 may include one or more application identifiers associated with the user profile for user 101A and other users, such as user 101B. The application identifiers can include identifiers for applications that relate to visual interaction, applications that are user specific and other applications appropriate for the type of transferable device operated by a user. Visual interaction, for purposes of this application relate to any use of the transferable communications device that require visual attention. The applications that require visual interaction may include, but are not limited to text messaging applications, instant messaging applications, real-time interactive gaming applications, emailing applications, and any other applications that require visual attention by a user and a transferable communications device. For example, an application that requires visual interaction that would cause a user to not pay attention to activities surrounding the user would be an application relating to visual interaction, such as text messaging while the user is driving. Other applications that require visual interaction can include games, videos, text messaging, or other applications that require a user's visual attention paid to the transferable communications device instead of the user's surroundings.

The user profile database 105 may include data representing various applications that require visual interaction applications of one or more users (e.g. user 101A). The user profile database 105 can also include other users such as 101B user B data, or any number of other users. For example, user 101B could be a transferable device user that has the right to control the functionality of the transferable communications device 106A of user 101A. As such, user profile database 105 would indicate that user 101B has credentials to overwrite user profile data of user 101A. With appropriate credentials, User 101B can identify, modify or delete the user 101A visual application data 1052 associated with the deactivation cueing logic 103-3 and/or reactivation cueing logic 103-4. The credentials can be hierarchical such that alterations, modifications and deletions by other users such as 101B are effective for limited purposes, such as to affect only certain applications, such as those stored in visual application data 1052.

Memory 104 is coupled to processor 103 to enable interchange between user profile management logic 103-1, velocity metric logic 103-2, deactivation cueing logic 103-3 and reactivation cueing logic 103-4 and user profile database 105.

User-profile management logic 103-1 may include logic for managing one or more user profiles stored on the carrier/service provider server 100. For example, user-profile management logic 103-1 could provide management for determining which applications should be subject to a determination of velocity.

Velocity metric logic 103-2 may include logic for determining a discrete probability calculation. More specifically, velocity metric logic 103-2 could include logic that determines a probability calculation that measures a current velocity at which a transferable communications device is moving. The probability calculation can be implemented by collecting data from one or more sources. For example, velocity metric logic 103-2 could receive actual velocity data from user 101A via communications data transceiver module 102. Other sources include communications from transferable communications device 106A that indirectly provide velocity data, such as a GPS location, an identification of at least two locations and a time parameter indicative of when the transferable communications device passed by the at least two locations, a speed determination from a module within the transferable communications device and the like.

In one embodiment, the velocity metric logic determines an instant velocity vector v of transferable communications device 106 as a function of position of transferable communications device 106. For example, transferable communications device 106 could have positions x(t) at time t and x(t+Δt) at time t+Δt. Therefore, the velocity can be computed as the derivative of position.

$$v = \lim_{\Delta t \to 0} \frac{x(t+\Delta t) - x(t)}{\Delta t} = \frac{dx}{dt}.$$

The equation for the velocity of a transferable communication device can be obtained mathematically by evaluating the integral of the equation for its acceleration beginning from some initial period time $t_0$ to some point in time later $t_n$.

The final velocity v of a transferable communications device which starts with velocity u and then accelerates at constant acceleration a for a period of time (Δt) is:

$$v = u + a\Delta t$$

The average velocity of an object undergoing constant acceleration is $$\frac{(u+v)}{2},$$

where u is the initial velocity and v is the final velocity. In one embodiment, the initial velocity may be determined by a global positioning system or other initial velocity determination system.

Velocity metric logic 103-2 may determine the velocity at which transferable communications device 106 is moving by calculating either the instant velocity or final velocity, depending on which variables and constants are detected or received. As is known, the scalar absolute value of velocity is speed. Velocity metric logic 103-2 can also determine a speed at which the transferable communications device travels if the direction the transferable device is traveling is not important.

In one embodiment, the velocity metric logic 103-2 determines periodic calculations of velocity. For example, velocity metric logic 103-2 can determine a probability that a velocity of the transferable device exceeds a stored requirement in user profile database 105. Conversely, velocity metric logic 103-2 can determine that transferable device 106A no longer exceeds a predetermined velocity and send a cue to reactivation cueing logic 103-3 that one or more applications can be restored or that functionality to the device can be restored.

Deactivation cueing logic 103-3 and reactivation cueing logic 103-4 (if present) are coupled to velocity metric logic 103-2. Deactivation cueing logic 103-3 may receive data from velocity metric logic 103-2 and provide a deactivation cue to the transferable communications device to deactivate the device or to deactivate one or more application running on the device. In one embodiment, deactivation cueing logic sends a message to communications data transceiver module to cut off communications ability to transferable communications device 106A. For example, the message could be a simple data script to cut off all operations for the device 106A. In another embodiment deactivation cueing logic may determine based on user profile database 105, which applications are running on the device 106A to determine whether, in accordance with the user profile, deactivation of the device is necessary. Alternatively, deactivation cueing logic may determine based on user profile database 105 that one or more applications should be shut down. For example, if the user profile indicates that a text messaging application can be turned off while maintaining other functionalities of the transferable device, in one embodiment, deactivation cueing logic 103-3 deactivates only that application or predetermined applications.

In one embodiment, deactivation cueing logic 103-3 is coupled to reactivation cueing logic 103-4 so that reactivation of any applications can be performed after a determination from velocity metric logic 103-2 that the transferable communications device is no longer traveling at a velocity beyond a predetermined velocity.

In an embodiment, transferable communications device 106A may include, but is not limited to, a cell phone, satellite phone, Blackberry®, and/or portable computing device. In one embodiment, transferable communications device 106A may include velocity module 106-1. A user profile for the device can activate an application, such as an application operating via velocity module 106-1 that identifies a speed at which the transferable device moves and determines whether to deactivate the transferable device, or one or more applications running on the device. Numerous types of velocity modules may be used. For example, a velocity module could be implemented using a global positioning system (GPS), an imaging system that identifies one or more predetermined locations with known distances between them or the like. Velocity module can also be implemented using calibration technology that can identify a speed at which the device is moving by laser or radar speed detection circuitry.

In one embodiment, transferable communications device 106A may include a velocity module 106-1 configured to be coupled to communications module 106-2 to disable one or more types of communications when it is determined that the transferable device is moving at a predetermined velocity or speed. Numerous communications modules may be used. For example, the communications module 106-2 may include, but is not limited to, one or more of a cellular transceiver, a Bluetooth transceiver, a Wi-Fi transceiver, a satellite transceiver and a network port (e.g. a modem).

The transferable communications device 106A may also include a user interface 106-3. Numerous user interfaces may be used. For example, the user interface 106-3 may include one or more of a display screen, a touch screen, a keypad, a speaker system and a microphone.

Transferable communications device 106A also includes a processor 106-4 coupled to a memory 106-5. Memory 106-5 can include a database for storing a user profile, user phone numbers, pictures or other data. Processor 106-4 is shown including user profile management logic 106-41, velocity metric logic 106-42, Deactivation cueing logic 106-43 and reactivation cueing logic 106-44.

User-profile management logic 106-41 may include logic for managing user 101A's user profile. For example, user-profile management logic 103-1 could provide management for determining which applications should be subject to a determination of velocity.

Processor 106-4 also includes velocity metric logic 106-42 and may include logic for determining a discrete probability calculation. More specifically, velocity metric logic 106-42 could include logic that determines a probability calculation that measures a current velocity at which a transferable communications device is moving. The probability calculation can be implemented by collecting data from one or more sources. For example, velocity metric logic 106-42 could receive actual velocity data from user 101A via communications data transceiver module 102. Other sources include communications from a GPS location or from velocity module 106-1.

In one embodiment, the velocity metric logic 106-42 determines an instant velocity vector v of the transferable communications device as a function of positions. For example, transferable communications device 106 could have positions x(t) at time t and x(t+Δt) at time t+Δt. Therefore, the velocity can be computed as the derivative of position.

$$v = \lim_{\Delta t \to 0} \frac{x(t + \Delta t) - x(t)}{\Delta t} = \frac{dx}{dt}.$$

The equation for the velocity of a transferable communication device can be obtained mathematically by evaluating the integral of the equation for its acceleration beginning from some initial period time $t_0$ to some point in time later $t_n$.

The final velocity v of a transferable communications device which starts with velocity u and then accelerates at constant acceleration a for a period of time (Δt) is:

$$v = u + a\Delta t.$$

The average velocity of an object undergoing constant acceleration is $$\frac{(u+v)}{2},$$

where u is the initial velocity and v is the final velocity.

Velocity metric logic 106-42 can determine the velocity at which the transferable communications device is moving by calculating either the instant velocity or final velocity, depending on which variables and constants are detected or sent. As is known, the scalar absolute value of velocity is speed. Velocity metric logic 106-42 can also determine a speed at which the transferable communications device travels if the direction the transferable device is traveling is not important.

In one embodiment, the velocity metric logic 106-42 determines periodic calculations of velocity. For example, velocity metric logic 106-42 can determine a probability that a velocity of the transferable device exceeds a stored requirement in a user profile stored in memory 106-5. Velocity metric logic 106-42 may also perform a periodic geolocation calculation that determines that a probability that the transferable device has exceeded the maximum velocity is greater than a predetermined probability, such as a predetermined probability stored in memory 106-5. Conversely, velocity metric logic 106-42 can determine that transferable device 106A no longer exceeds a predetermined velocity and send a cue to reactivation cueing logic 103-3 that one or more applications can be restored or that functionality to the device can be restored.

Deactivation cueing logic 106-43 and reactivation cueing logic 106-44 (if present) are coupled to velocity metric logic 106-42. Deactivation cueing logic 106-43 may receive data from velocity metric logic 106-42 and provide a cue to the transferable communications device to deactivate the device or to deactivate one or more application running on the device. In one embodiment, deactivation cueing logic sends a message to communications data transceiver module to cut off communications ability to transferable communications device 106A. For example, the message could be a simple data script to cut off all operations for the device 106A. In another embodiment deactivation cueing logic may determine deactivation rules based on user profile database 105 or memory 106-5, which applications are running on the device 106A to determine whether, in accordance with the user profile, deactivation of the device is necessary. Alternatively, deactivation cueing logic may determine based on user profile database stored in memory 106-5 that one or more applications should be shut down. For example, if the user profile indicates that a text messaging application can be turned off while maintaining other functionalities of the transferable device, in one embodiment, deactivation cueing logic 106-43 deactivates only that application or predetermined applications.

In one embodiment, deactivation cueing logic 106-43 is coupled to reactivation cueing logic 106-44 so that reactivation of any applications can be performed after a determination from velocity metric logic 106-42 that the transferable communications device is no longer traveling at a velocity beyond a predetermined velocity.

Figure 2:
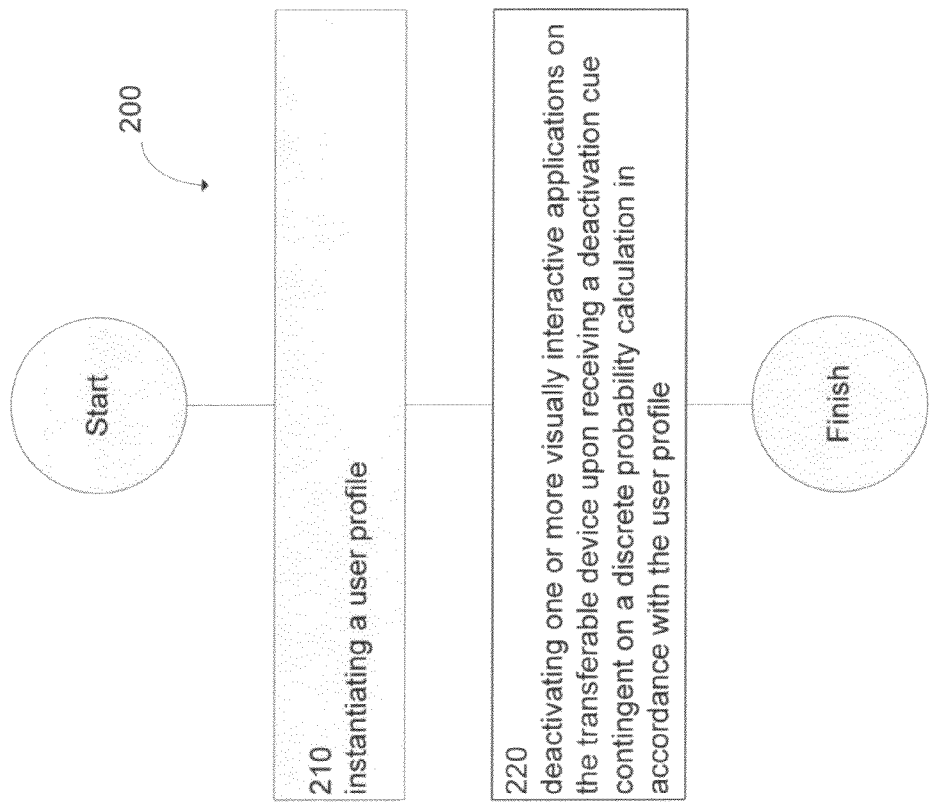
FIG. 2 is a high-level logic flowchart of a process.

FIG. 2 illustrates an operational flow 200 representing example operations related to deactivating the transferable communications device. In FIG. 2 and in following figures that include various examples of operational flows, discussion and explanation may be provided with respect to the above-described exemplary description of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those that are illustrated, or may be performed concurrently.

After a start operation, the operational flow 200 moves to an operation 210. Operation 210 depicts instantiating a user profile. For example, as shown in FIG. 1, a user profile for user 101A can be instantiated as a user profile stored in memory 106-5. Alternatively, a user profile stored at a client server/service provider 100 can be instantiated for the user 101A. For example user data 1051 can store user profile data and Operation 220 depicts deactivating one or more visually interactive applications on the transferable device upon receiving a deactivation cue contingent on a discrete probability calculation in accordance with the user profile. For example, either transferable device 106 or carrier/service provider 100 can cause deactivation of visually interactive applications running on transferable device 106 upon receiving a deactivation cue from either deactivation cueing logic 103-3 or deactivation cueing logic 106-43. Deactivation cueing logic 106-43 and/or 103-3 can be configured to deactivate based on user profile data stored in either user profile database 105 from carrier/service provider 100 or user profile data 106-51 from within transferable device 106.

Figure 3:
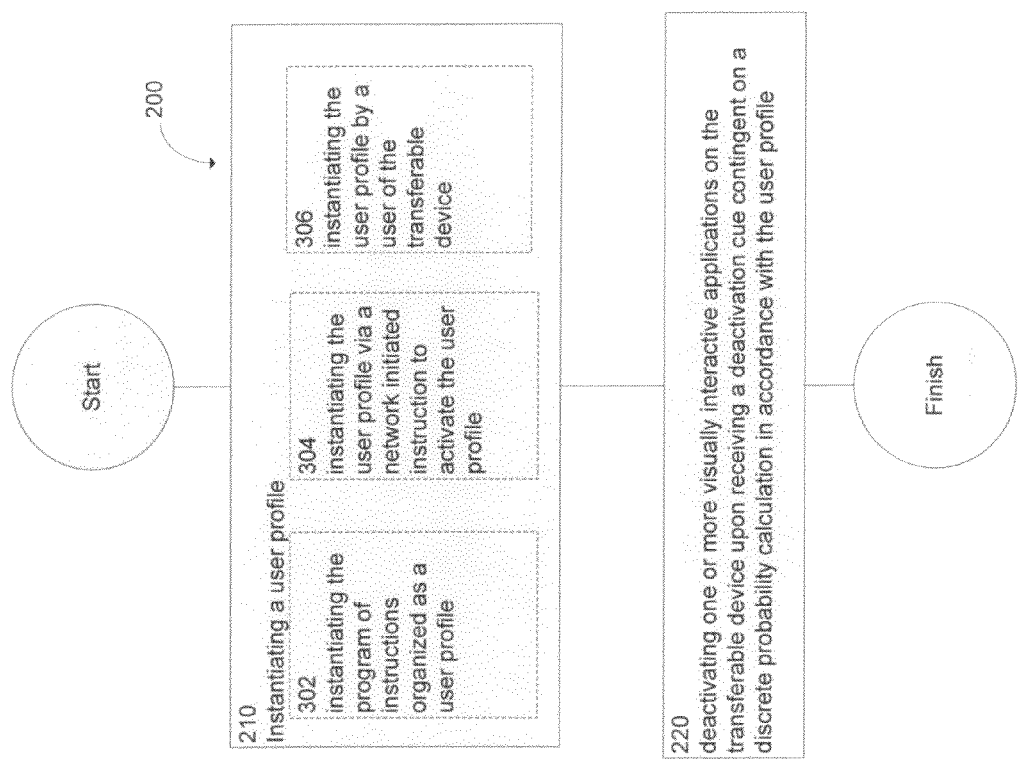
FIG. 3 is a high-level logic flowchart of a process.

FIG. 3 illustrates alternative embodiments of the example operational flow 200 of FIG. 2. FIG. 3 illustrates example embodiments where the operation 210 may include at least one additional operation. Additional operations may include an operation 302, an operation 304, and/or an operation 306.

The operation 302 illustrates instantiating the program of instructions organized as a user profile. For example, as shown in FIG. 1, the carrier/service provider server 100 or transferable communications device 106 can instantiate a user profile stored in memory on either the carrier/service provider server 100 or locally on transferable communications device 106.

The operation 304 illustrates instantiating the user profile via a network initiated instruction to activate the user profile. For example, as shown in FIG. 1, the carrier/service provider server 100 may instantiate a user profile for user 101A by instantiating a user profile either directly on the transferable communications device or indirectly via carrier/service provider server 100.

The operation 306 illustrates instantiating the user profile by a user of the transferable device For example, from within transferable device 106.3, user 101A may instantiate a user profile stored on transferable device 106.

Figure 4:
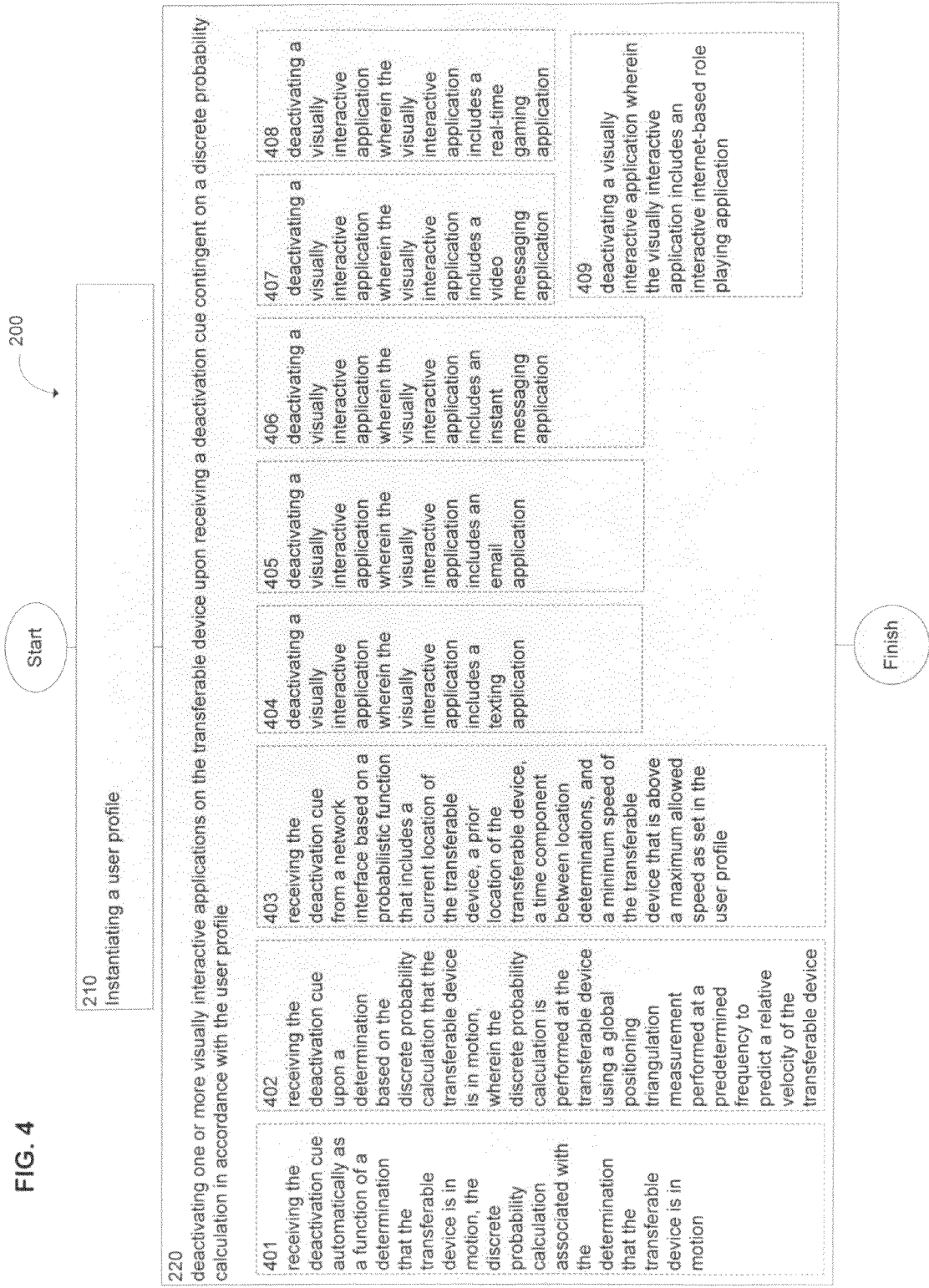
FIG. 4 is a high-level logic flowchart of a process.

FIG. 4 illustrates further alternative embodiments of the example operational flow 200 of FIG. 2. FIG. 4 illustrates example embodiments where the operation 220 may include at least one additional operation. Additional operations may include operations 401 through 409, either individually or in combination.

The operation 401 illustrates receiving the deactivation cue automatically as a function of a determination that the transferable device is in motion, the discrete probability calculation associated with the determination that the transferable device is in motion For example, as shown in FIG. 1, the deactivation cueing logic 103-3 may send a deactivation cue automatically upon determining that transferable device 106 is in motion. The communications data transceiver module 102 of the carrier/service provider server 100 may transmit the deactivation cue.

The operation 402 illustrates receiving the deactivation cue upon a determination based on the discrete probability calculation that the transferable device is in motion, wherein the discrete probability calculation is performed at the transferable device using a global positioning triangulation measurement performed at a predetermined frequency to predict a relative velocity of the transferable device. For example, as shown in FIG. 1, the deactivation cueing logic 103-3 may determine that transferable device 106 is in motion by determining a probability based on data received from a global positioning system, such as GPS 107. GPS 107 can send periodic measurements of location at a predetermined frequency to enable a discrete probability calculation to predict the velocity of the transferable device, which could be zero velocity (staying still) or could be a discrete velocity.

The operation 403 illustrates receiving the deactivation cue from a network interface based on a probabilistic function that includes a current location of the transferable device, a prior location of the transferable device, a time component between location determinations, and a maximum allowed speed as determined from the user profile. For example, as shown in FIG. 1, the deactivation cueing logic 103-3 may perform a probabilistic function to determine whether transferable device 106 is exceeding a predetermined speed set in the user profile.

The operation 404 illustrates deactivating a visually interactive application wherein the visually interactive application includes a texting application. For example as shown in FIG. 1, deactivation cueing logic 103-3 or 106-43 may determine that in accordance with the user profile for transferable device 106, that texting applications are subject to deactivation when one or more events are determined to be probable based on information available to deactivation cueing logic 103-3 or 106-43.

The operation 405 illustrates deactivating a visually interactive application wherein the visually interactive application includes an email application. For example as shown in FIG. 1, deactivation cueing logic 103-3 or 106-43 may determine that in accordance with the user profile for transferable device 106, that email applications are subject to deactivation when one or more events are determined to be probable based on information available to deactivation cueing logic 103-3 or 106-43.

The operation 406 illustrates deactivating a visually interactive application wherein the visually interactive application includes an instant messaging application. For example as shown in FIG. 1, deactivation cueing logic 103-3 or 106-43 may determine that in accordance with the user profile for transferable device 106, that instant messaging applications are subject to deactivation when one or more events are determined to be probable based on information available to deactivation cueing logic 103-3 or 106-43.

The operation 407 illustrates deactivating a visually interactive application wherein the visually interactive application includes a video messaging application. For example as shown in FIG. 1, deactivation cueing logic 103-3 or 106-43 may determine that in accordance with the user profile for transferable device 106, that video messaging applications are subject to deactivation when one or more events are determined to be probable based on information available to deactivation cueing logic 103-3 or 106-43.

The operation 408 illustrates deactivating a visually interactive application wherein the visually interactive application includes a real-time gaming application. For example as shown in FIG. 1, deactivation cueing logic 103-3 or 106-43 may determine that in accordance with the user profile for transferable device 106, that real-time gaming applications are subject to deactivation when one or more events are determined to be probable based on information available to deactivation cueing logic 103-3 or 106-43.

The operation 409 illustrates deactivating a visually interactive application wherein the visually interactive application includes an interactive internet-based role playing application. For example as shown in FIG. 1, deactivation cueing logic 103-3 or 106-43 may determine that in accordance with the user profile for transferable device 106, that interactive internet-based role playing applications are subject to deactivation when one or more events are determined to be probable based on information available to deactivation cueing logic 103-3 or 106-43.

Figure 5:
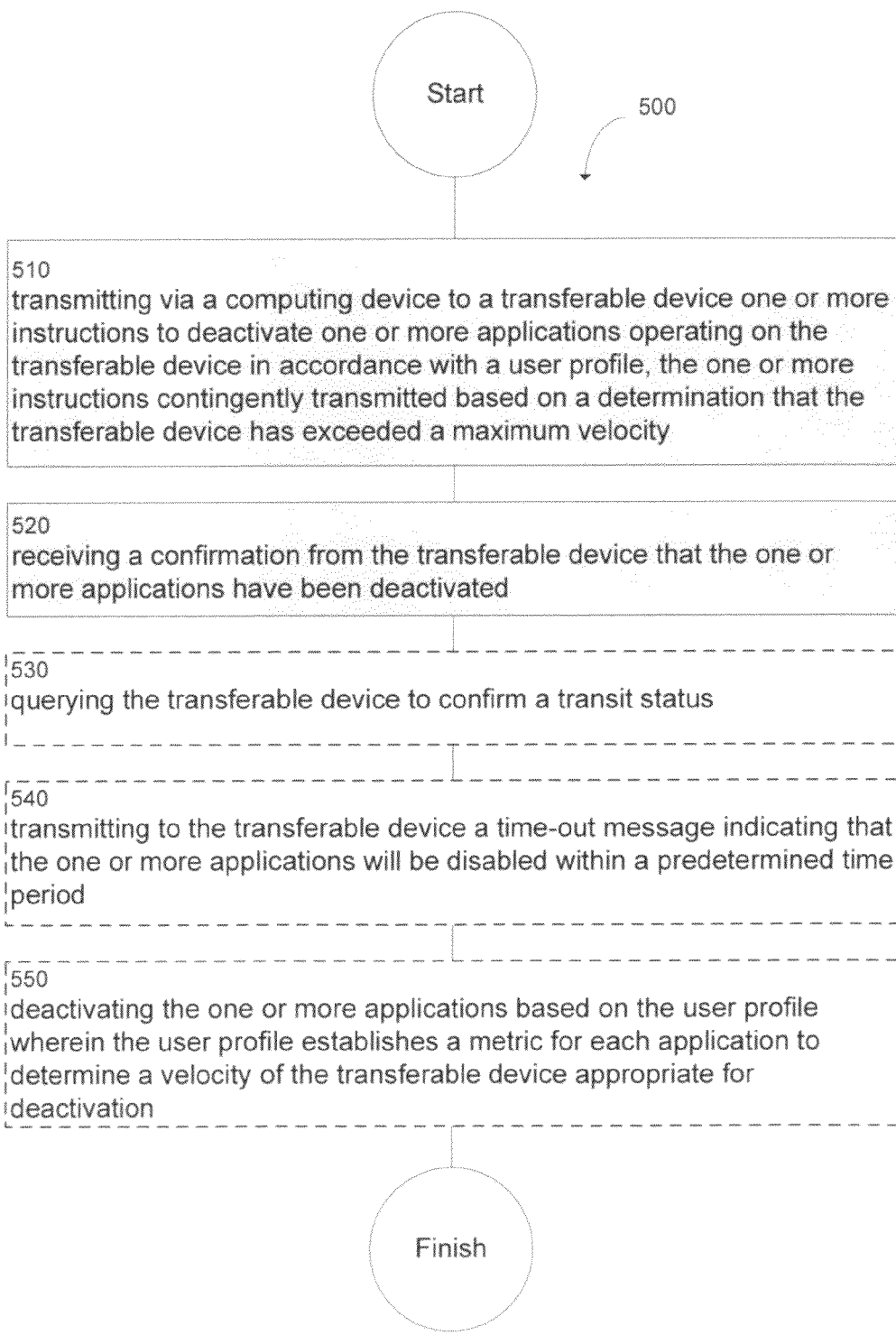
FIG. 5 is a high-level logic flowchart of a process.

FIG. 5 illustrates an operational flow 500 representing example operations related to transmitting instructions for deactivation of a transferable device. Operation 510 provides for transmitting via a computing device to a transferable device one or more instructions to deactivate one or more applications operating on the transferable device in accordance with a user profile, the one or more instructions contingently transmitted based on a determination that the transferable device has exceeded a maximum velocity. For example as shown in FIG. 1, communications data transceiver module 102 of the carrier/service provider server 100 may transmit one or more instructions to deactivate one or more applications running on transferable device 106 in accordance with user profile data.

The operation 520 illustrates receiving a confirmation from the transferable device that the one or more applications have been deactivated. For example, as shown in FIG. 1, communications data transceiver module 102 of the carrier/service provider server 100 may receive a confirmation that one or more applications on transferable device 106 have been deactivated.

The optional operation 530 illustrates querying the transferable device to confirm a transit status. For example, as shown in FIG. 1, communications data transceiver module 102 of the carrier/service provider server 100 may transmit a query to user 101A at transferable communications device 106A. The query may include a query to enable a user to confirm or deny that the transferable device 106A is in a transit status. A transit status can include for purposes of this disclosure, a velocity beyond a permitted velocity identified in a user profile. A transit status can also include a permitted transit status as passenger of a moving vehicle. For example, the query could ask user 101A to confirm that the transit status is that of a passenger and not as a driver of a motor vehicle. In one embodiment, the query can automatically deactivate the transferable device 106A if a satisfactory answer is not provided within a predetermined amount of time. For example, optional operation 540 illustrates transmitting to the transferable device a time-out message indicating that the one or more applications will be disabled within a predetermined time period. For example, if carrier/service provider server 100 determines that transferable device 106A requires deactivation, a message to user 101A may be sent to enable user 101A to close out of applications that are running or to save data as necessary before the applications are disabled.

Optional operation 550 illustrates deactivating the one or more applications based on the user profile wherein the user profile establishes a metric for each application to determine a velocity of the transferable device appropriate for deactivation. For example, referring to FIG. 1, user profile data stored at either carrier/service provider server 100 or within transferable device 106A can include specific velocities or metrics that allow specific velocities to be associated with different applications that can run on transferable device 106A. Thus, an application which requires more visual attention that could distract a driver would be associated with a lower velocity than an application that requires less visual attention.

Figure 6:
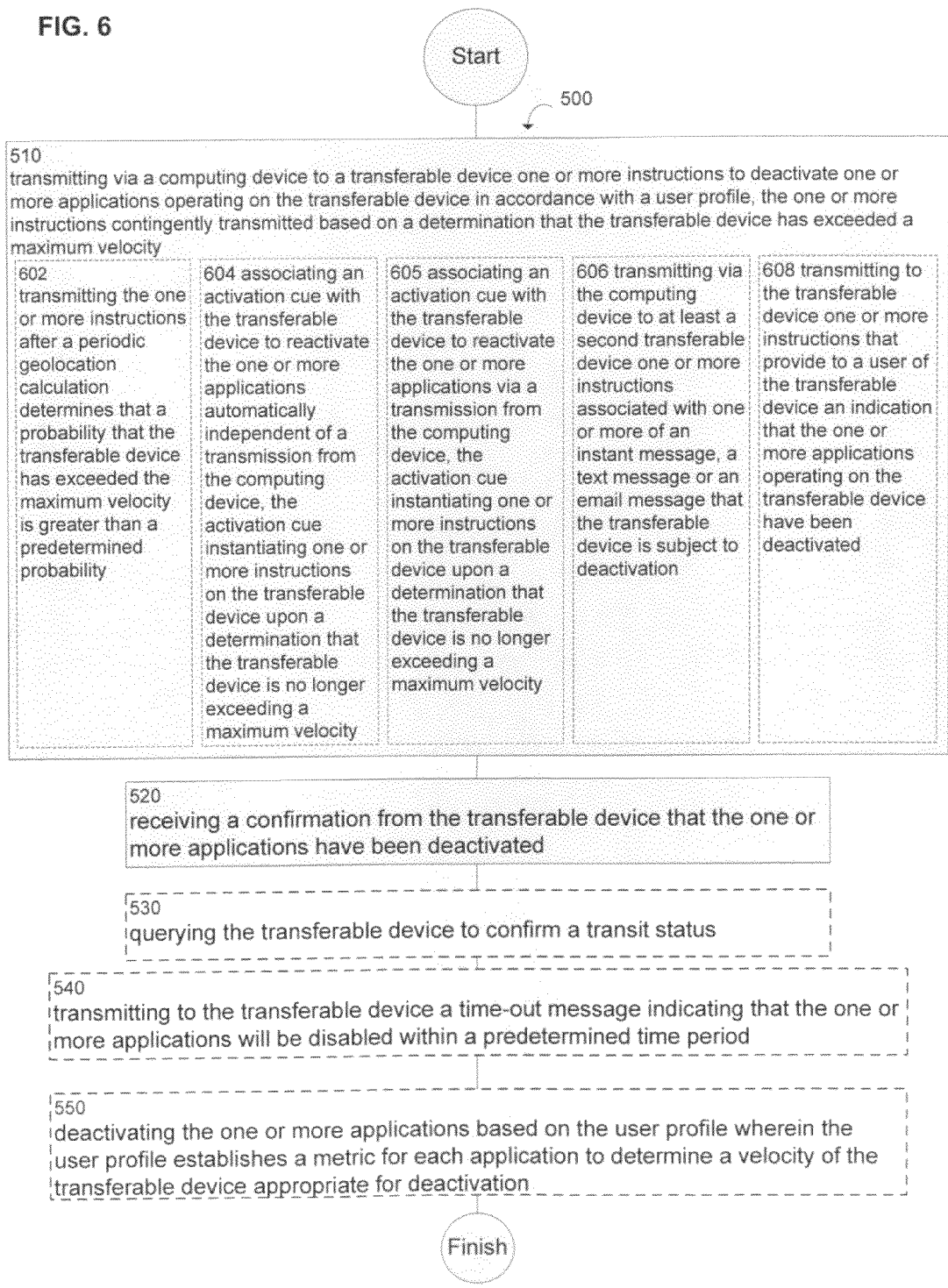
FIG. 6 is a high-level logic flowchart of a process.

FIG. 6 illustrates alternative embodiments of the example operational flow 500 of FIG. 5. FIG. 6 illustrates example embodiments where the operation 510 may include at least one additional operation. Additional operations may include an operation 602, an operation 604, 605, 606, 607 and/or an operation 608.

Operation 602 illustrates transmitting the one or more instructions after a periodic geolocation calculation determines that a probability that the transferable device has exceeded the maximum velocity is greater than a predetermined probability. For example, referring to FIG. 1, user profile database 105 located in carrier/service provider server 100, or user profile data 106-51 located in transferable communications device 106A may provide data regarding maximum velocity and probabilities predetermined to be associated with a maximum permitted velocity for the transferable device 106. Processor 103 and/or processor 106-4 may perform periodic geolocation calculations in velocity metric logic 103-2 and/or velocity metric logic 106-42. In one embodiment, the periodic geolocation calculations use data received from GPS 107 satellite data. The instructions to deactivate transferable communications device 106A may be transmitted via communications data transceiver module 102 and/or communications module 106-2 from within transferable communications device 106A.

Operation 604 illustrates associating an activation cue with the transferable device to reactivate the one or more applications automatically independent of a transmission from the computing device, the activation cue instantiating one or more instructions on the transferable device upon a determination that the transferable device is no longer exceeding a maximum velocity. For example, referring to FIG. 1, user profile database 105 located in carrier/service provider server 100, or user profile data 106-51 located in transferable communications device 106A may provide data regarding maximum velocity and provide instructions to reactivate transferable communications device 106A upon predetermined conditions, such as a determination that a velocity associated with transferable communications device 106A is below a maximum permitted velocity for transferable communications device 106. Processor 103 and/or processor 106-4 may perform determination of the velocity in velocity metric logic 103-2 and/or velocity metric logic 106-42. The instructions to reactivate transferable communications device 106A, such as via an activation cue may be transmitted via communications data transceiver module 102 and/or communications module 106-2 from within transferable communications device 106A.

Operation 605 illustrates associating an activation cue with the transferable device to reactivate the one or more applications via a transmission from the computing device, the activation cue instantiating one or more instructions on the transferable device upon a determination that the transferable device is no longer exceeding a maximum velocity. For example, referring to FIG. 1, user profile database 105 located in carrier/service provider server 100 may provide data regarding maximum velocity and provide instructions to reactivate transferable communications device 106A upon predetermined conditions. Processor 103 and/or processor 106-4 may generate an activation cue after determining a velocity in velocity metric logic 103-2. The instructions to reactivate transferable communications device 106A, such as via an activation cue may be transmitted via communications data transceiver module 102 from carrier/service provider server 100 as a computing device.

Operation 606 illustrates transmitting via the computing device to at least a second transferable device one or more instructions associated with one or more of an instant message, a text message or an email message that the transferable device has been deactivated. For example, referring to FIG. 1, user profile database 105 located in carrier/service provider server 100 may provide data regarding one or more other transferable communications devices, such as communications device 106B, such that user profile data for user 101A indicates that any deactivation of transferable communications device 106A generates a message to user 101B that transferable communications device 106A has been deactivated. The message may be a text message to a mobile phone, an email message to a user of communications device 106B, an instant message to transferable device 106B or the like.

Operation 608 illustrates transmitting to the transferable device one or more instructions that provide to a user of the transferable device an indication that the one or more applications operating on the transferable device have been deactivated. For example, referring to FIG. 1, user profile database 105 located in carrier/service provider server 100, or user profile data 106-51 located in transferable communications device 106A may provide data regarding maximum velocity and provide instructions to deactivate one or more applications operating on transferable communications device 106A. Each application may be associated with different maximum permitted velocities of transferable communications device 106A. For example, an application related to music could be permitted at any velocity, while and application related to text messaging could be deactivated at a predetermined velocity. Processor 103 and/or processor 106-4 may perform determination of the velocity in velocity metric logic 103-2 and/or velocity metric logic 106-42. An indication that the predetermined one or more applications have been deactivated can be transmitted to transferable communications device 106A, such as via an application deactivation cue transmitted via communications data transceiver module 102 and/or communications module 106-2 from within transferable communications device 106A.

Figure 7:
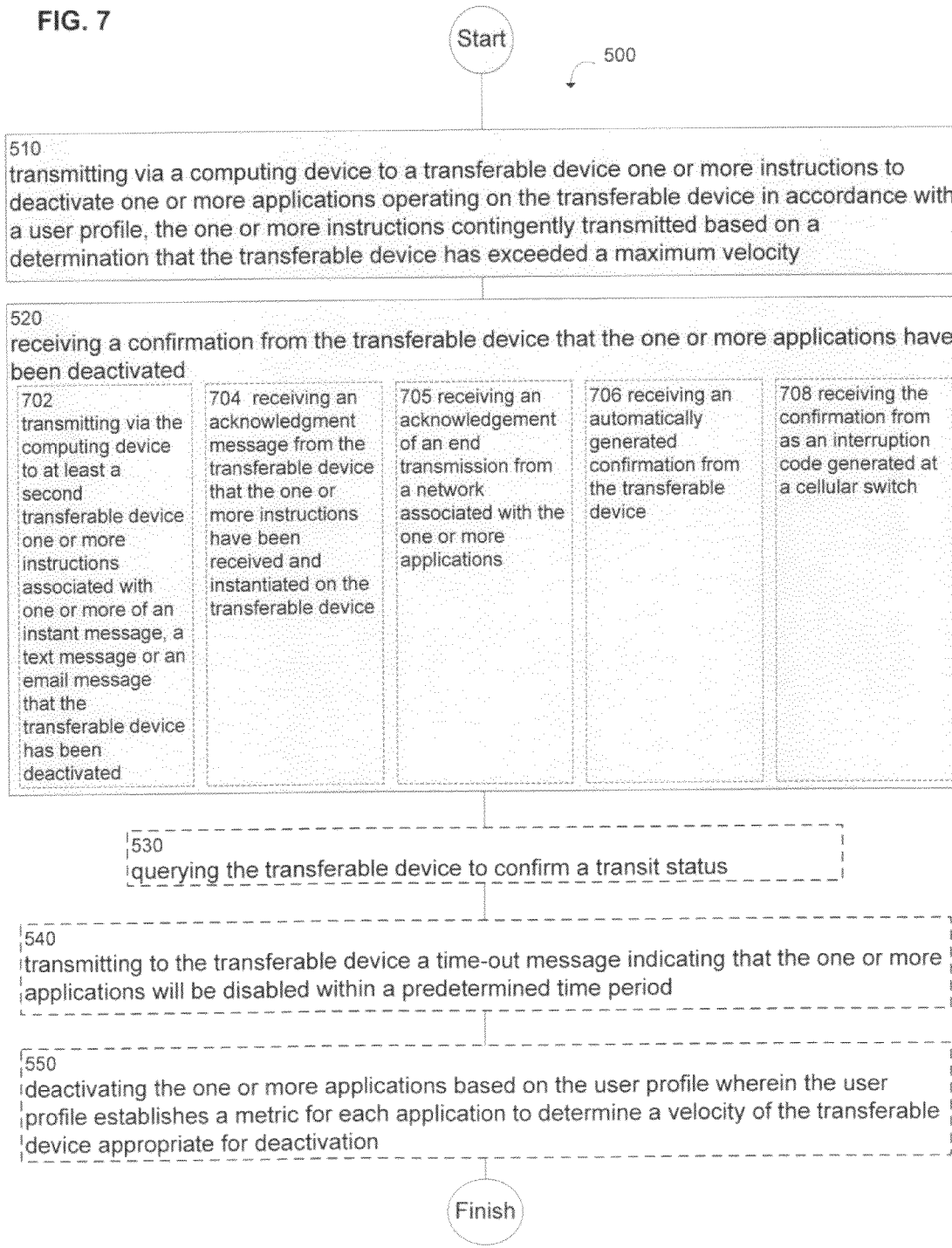
FIG. 7 is a high-level logic flowchart of a process.

FIG. 7 illustrates further alternative embodiments of the example operational flow 500 of FIG. 5. FIG. 6 illustrates example embodiments where the operation 520 may include at least one additional operation. Additional operations may include an operation 702, an operation 704, an operation 705, an operation 706, an operation 707 and/or an operation 708.

Operation 702 illustrates transmitting via the computing device to at least a second transferable device one or more instructions associated with one or more of an instant message, a text message or an email message that the transferable device has been deactivated. For example, referring to FIG. 1, user profile database 105 located in carrier/service provider server 100 may provide data regarding one or more other transferable communications devices, such as communications device 106B, such that user profile data for user 101A indicates that any deactivation of transferable communications device 106A generates a message to user 101B that transferable communications device 106A has been deactivated. The message may be a text message to a mobile phone, an email message to a user of communications device 106B, an instant message to transferable device 106B or the like.

Operation 704 illustrates receiving an acknowledgment message from the transferable device that the one or more instructions have been received and instantiated on the transferable device. For example, referring to FIG. 1, carrier/service provider server 100 can receive an acknowledgement message from transferable device 106A via communications data transceiver module 102 that transferable communications device 106A has received and instantiated instructions via processor 106-4. Instructions can include those to deactivate, reactivate the device or to deactivate or reactivate certain predetermined applications in accordance with a user profile 106-51 or user data 1051.

Operation 705 illustrates receiving an acknowledgement of an end transmission from a network associated with the one or more applications. For example, referring to FIG. 1, carrier/service provider server 100 can receive "end transmission" message that confirms that a network providing service to transferable device 106A no longer provides transmissions to and from transferable communications device 106A. The carrier/service provider server 100 can receive the "end transmission" via communications data transceiver module 102 that transferable communications device 106A has been subjected to a termination of service.

Operation 706 illustrates receiving an automatically generated confirmation from the transferable device. For example, referring to FIG. 1, carrier/service provider server 100 can receive an automatically-generated confirmation message from transferable device 106A via communications data transceiver module 102 that transferable communications device 106A has received and instantiated instructions via processor 106-4. Instructions can include those to deactivate, reactivate the device or to deactivate or reactivate certain predetermined applications in accordance with a user profile 106-51 or user data 1051.

Operation 708 illustrates receiving the confirmation as an interruption code generated at a cellular switch. For example, referring to FIG. 1, carrier/service provider server 100 can receive a message in the form of an interruption code at a cellular switching station or head end or other code generating point in a cellular network confirms that a network providing service to transferable device 106A no longer provides transmissions to and from transferable communications device 106A. The carrier/service provider server 100 can receive the interruption code via communications data transceiver module 102 that transferable communications device 106A has been subjected to a termination of service.

Figure 8:
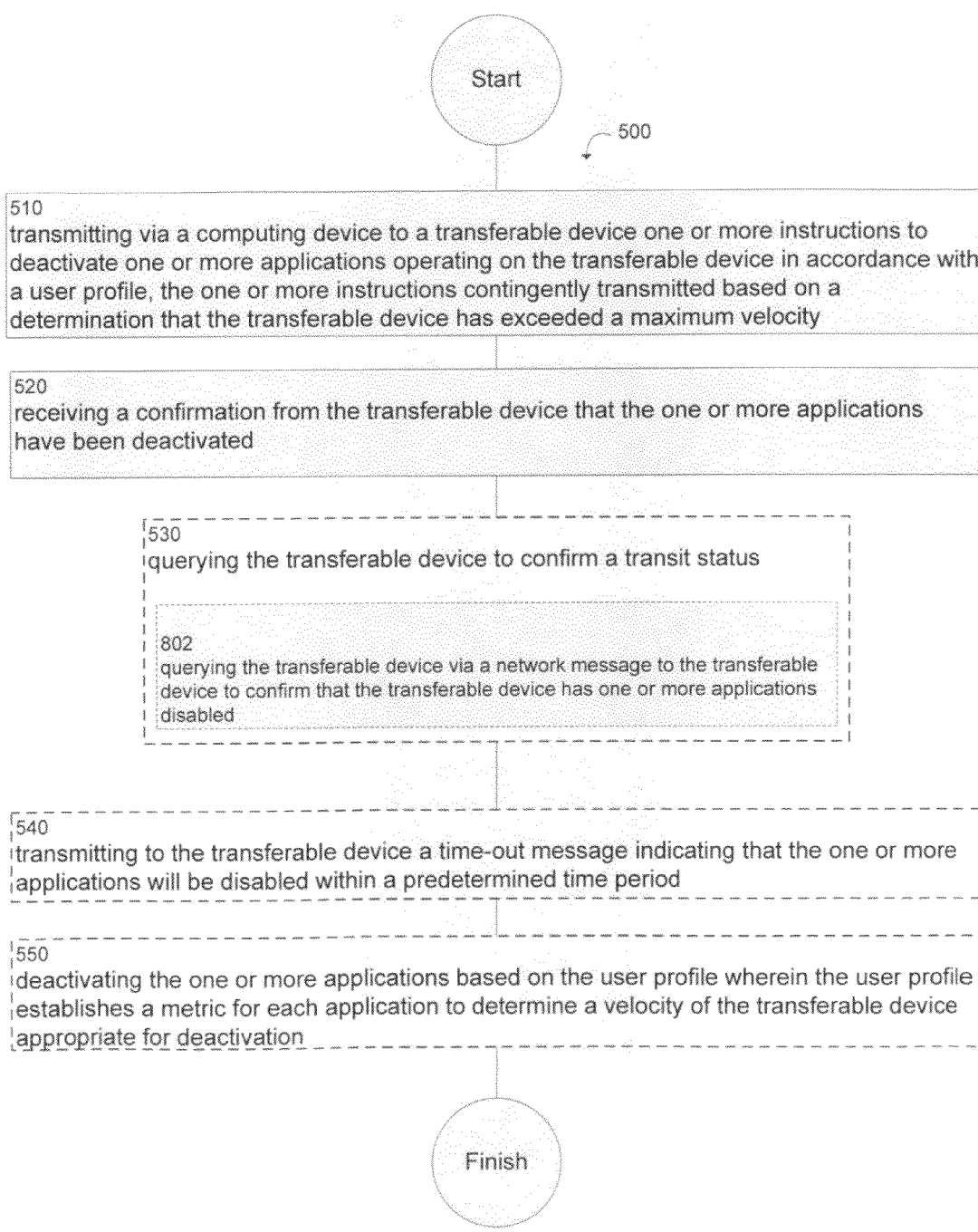
FIG. 8 is a high-level logic flowchart of a process.

Referring to FIG. 8, operational flow 500 includes optional operation 530, which may include at least one additional operation, operation 802.

Operation 802 illustrates querying the transferable device via a network message to the transferable device to confirm that the transferable device has one or more applications disabled. For example, referring to FIG. 1, carrier/service provider server 100 can send a query message to transferable communications device 106A to confirm that a network providing service to transferable device 106A no longer provides transmissions to and from transferable communications device 106A or that transmissions related to one or more applications have been disabled. The carrier/service provider server 100 can query via a network message to transferable communications device 106A that one or more applications have been disabled.

Figure 9:
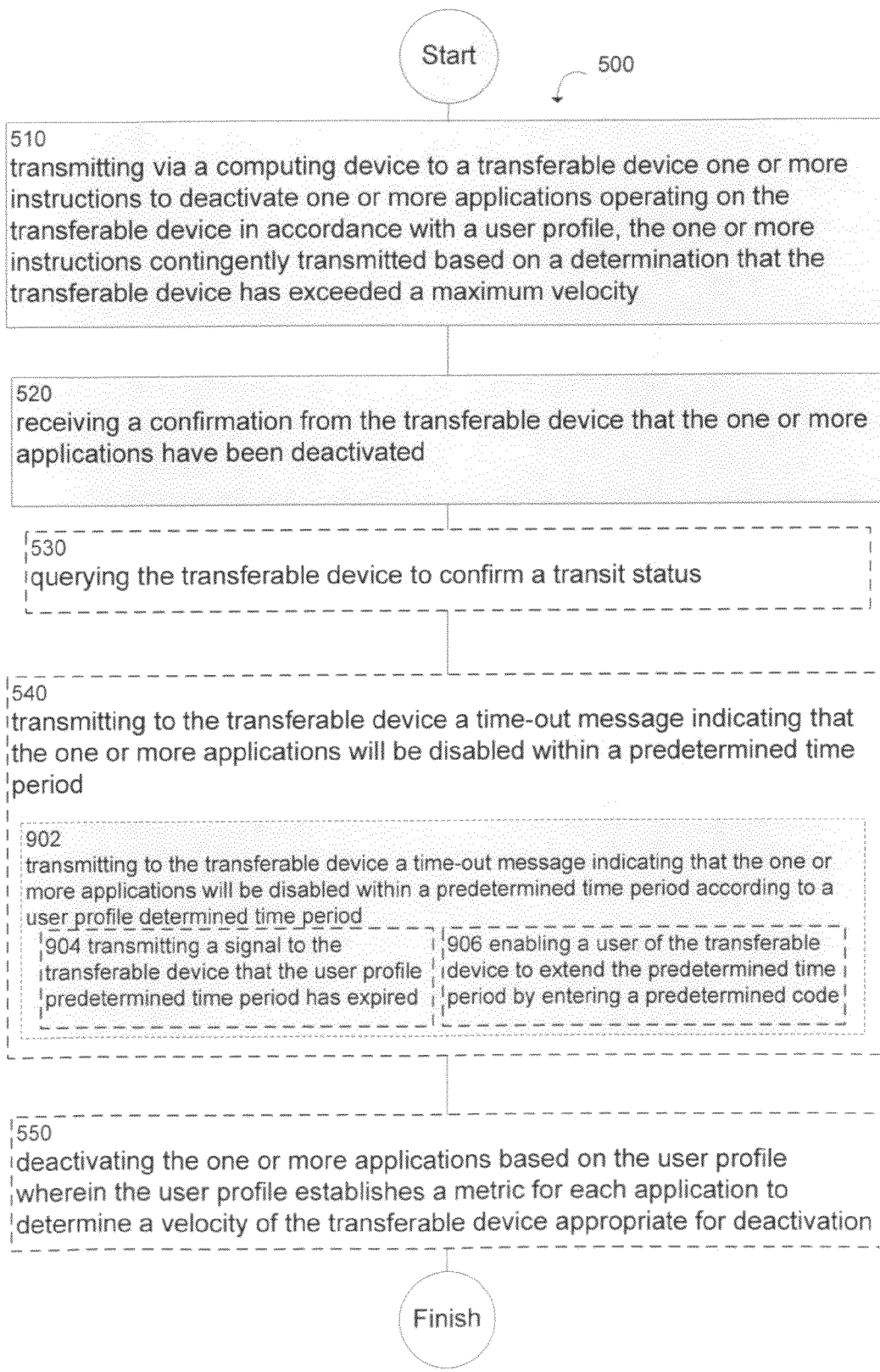
FIG. 9 is a high-level logic flowchart of a process.

Referring to FIG. 9, operational flow 500 includes optional operation 540, which may include at least one additional operation, operation 902.

Operation 902 illustrates transmitting to the transferable device a time-out message indicating that the one or more applications will be disabled within a predetermined time period according to a user profile determined time period. For example, referring to FIG. 1, carrier/service provider server 100 can send a message to transferable communications device 106A to provide a time-out for one or more applications, such as text messaging or the like.

Operation 902 may further include optional operations 904 and 905.

Operation 904 illustrates transmitting a signal to the transferable device that the user profile predetermined time period has expired. For example, referring to FIG. 1, carrier/service provider server 100 can send a message to transferable communications device 106A to provide that the time-out limit was reached and imminent termination will occur for one or more applications, such as text messaging or the like.

Operation 906 illustrates enabling a user of the transferable device to extend the predetermined time period by entering a predetermined code. For example, referring to FIG. 1, a user 101A of transferable communications device 106A via user interface 106-3 can enter a predetermined code, such as a code set up in the user profile, that can extend the predetermined time period before deactivation of one or more applications, the extension may include a period of minutes, hours, or be indefinite as identified in the user profile 1051 and/or 106-51.

Figure 10:
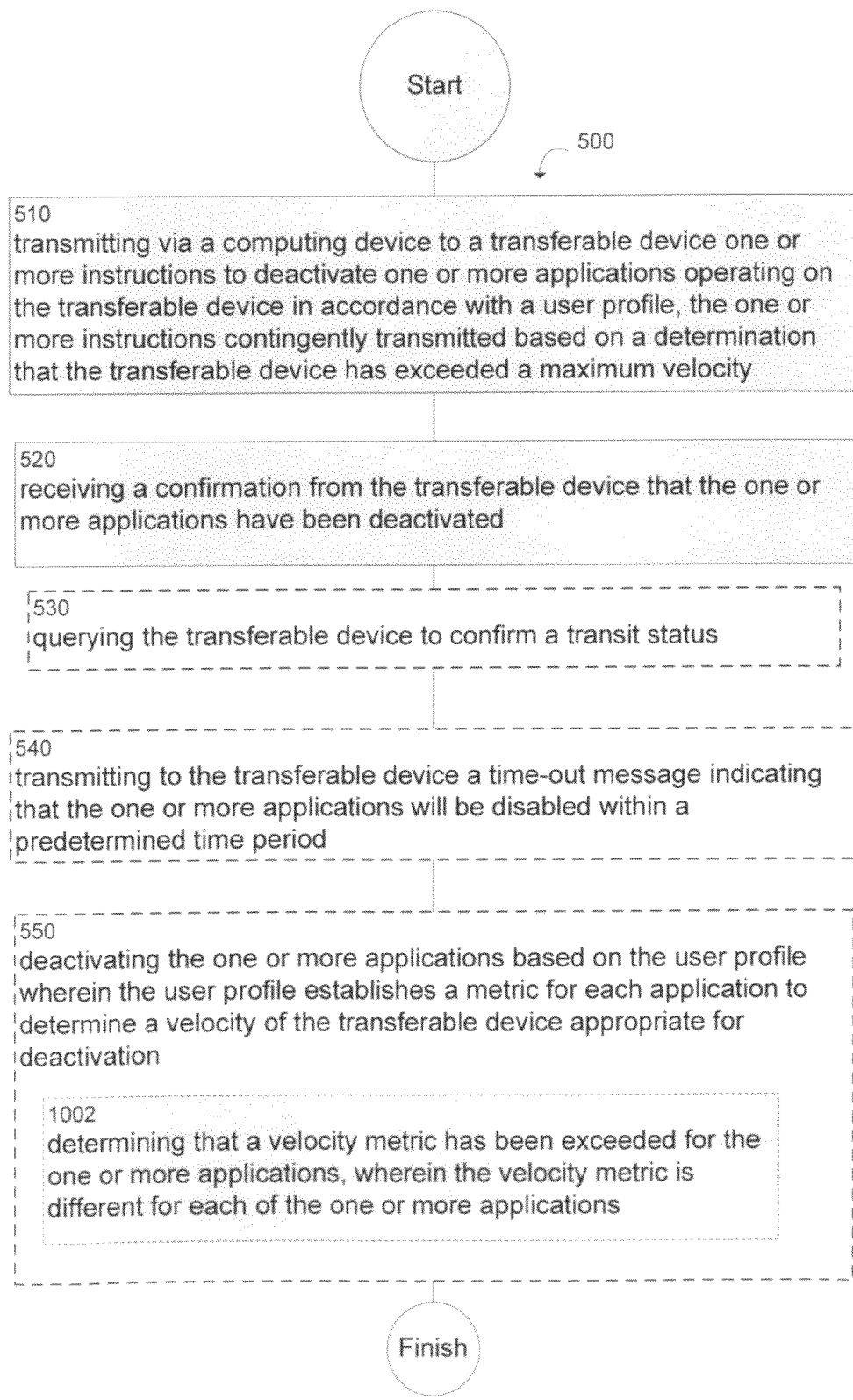
FIG. 10 is a high-level logic flowchart of a process.

FIG. 10 illustrates that operational flow 500, operation 550 may include at least one additional operation, operation 1002. Specifically, operation 1002 illustrates determining that a velocity metric has been exceeded for the one or more applications, wherein the velocity metric is different for each of the one or more applications. For example, referring to FIG. 1, velocity metric logic 106-42 may determine an instant velocity vector v of the transferable communications device as a function of positions of transferable communications device 106. such as positions x(t) at time t and x(t+Δt) at time t+Δt. Velocity metric logic 106-42 can determine the velocity at which the transferable communications device is moving by calculating either the instant velocity or final velocity, depending on which variables and constants are detected or sent. After determining the velocity metric, processor 106-4 or processor 103 can compare the velocity metric to visual application data 1052 and/or user profile data 106-51 where velocity metrics associated with each of one or more applications of transferable communications device 106A are located. If a velocity metric has been exceeded for one or more applications, those applications would then be subject to deactivation.

Figure 11:
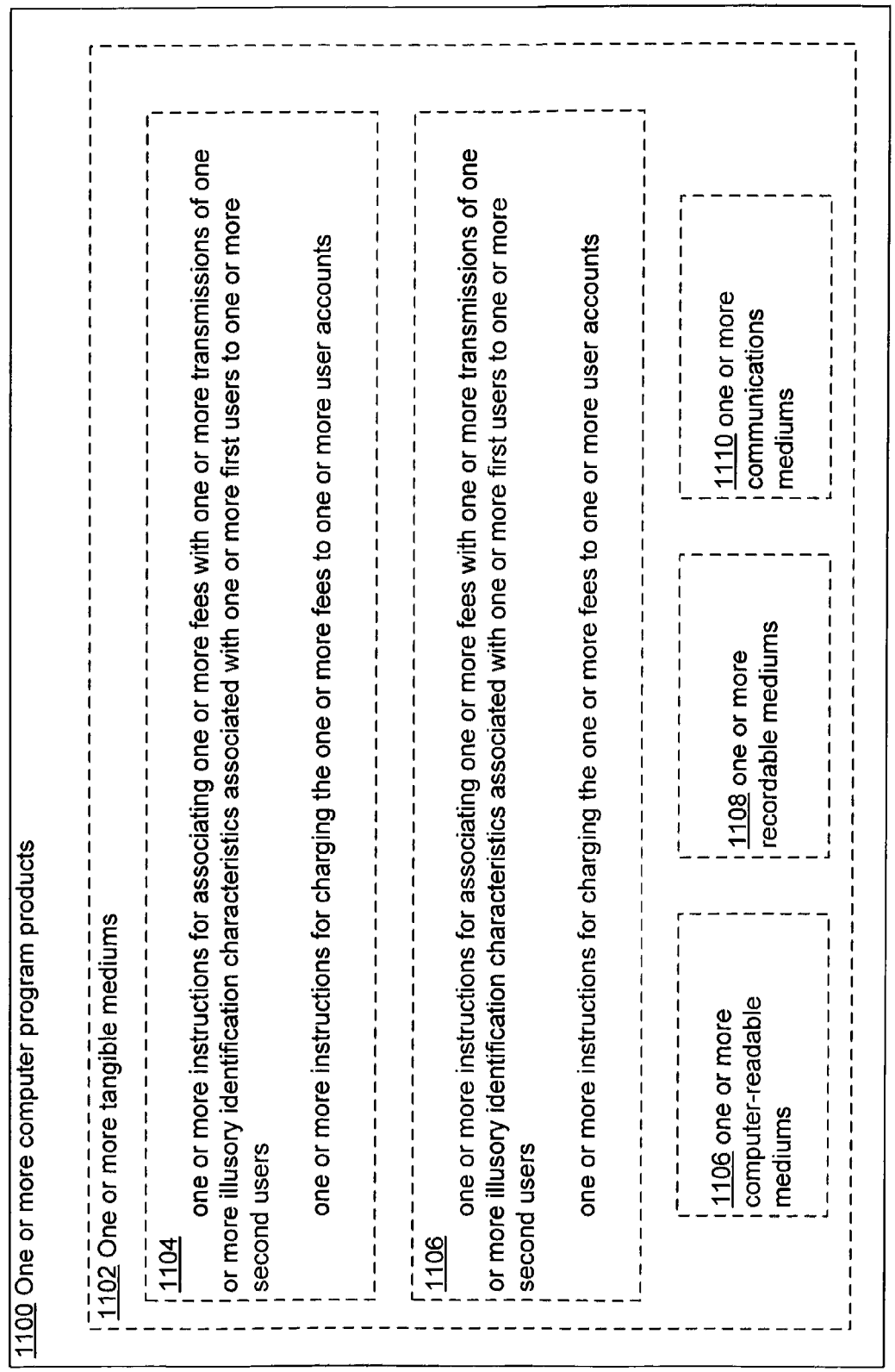
FIG. 11 shows a high-level block diagram of a computer program product.

FIG. 11 illustrates a partial view of an example computer program product 1100 that includes a computer program 1104 for executing a computer process on a computing device. An embodiment of the example computer program product 1100 is provided using a tangible medium 1102, and may include one or more instructions 1104 for instantiating a user profile; and one or more instructions for deactivating one or more visually interactive applications on the transferable device upon receiving a deactivation cue contingent on a discrete probability calculation in accordance with the user profile. The one or more instructions may be, for example, computer executable and/or logic-implemented instructions. In one implementation, the tangible medium 1102 may include a computer-readable medium 1106. In one implementation, the tangible medium 1102 may include a recordable medium 1108. In one implementation, the tangible medium 1102 may include an article of manufacture logic-implementing medium 1110.

Another embodiment of the example computer program product 1100 using a tangible medium 1102 may include one or more instructions 1106 for transmitting via a computing device to a transferable device one or more instructions to deactivate one or more applications operating on the transferable device in accordance with a user profile, the one or more instructions contingently transmitted based on a determination that the transferable device has exceeded a maximum velocity; and one or more instructions for receiving a confirmation from the transferable device that the one or more applications have been deactivated. The one or more instructions may be, for example, computer executable and/or logic-implemented instructions. In one implementation, the tangible medium 1102 may include a computer-readable medium 1106. In one implementation, the tangible medium 1102 may include a recordable medium 1108. In one implementation, the tangible medium 1102 may include an article of manufacture logic-implementing medium 1110.

Figure 12:
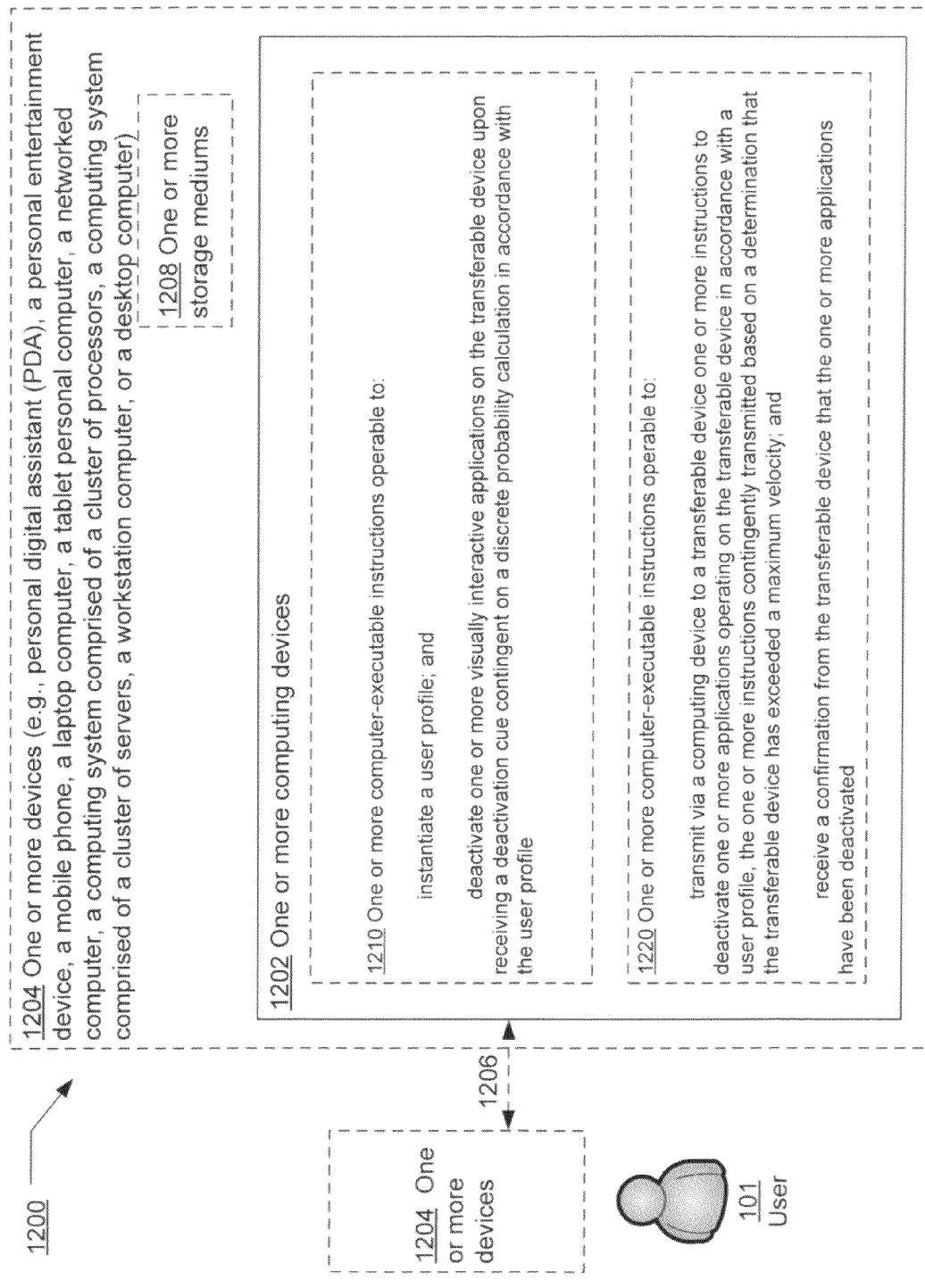
FIG. 12 shows a high-level block diagram of a system for deactivating a transferable device.

FIG. 12 illustrates an example system 1200 in which embodiments may be implemented. The system 1200 includes a computing system environment. The system 1200 also illustrates the user 101 using a device 1204, which is optionally shown as being in communication with a computing device 1202 by way of an optional coupling 1206. The optional coupling 1206 may represent a local, wide-area, or peer-to-peer network, or may represent a bus that is internal to a computing device (e.g., in example embodiments in which the computing device 1202 is contained in whole or in part within the device 1204). A storage medium 1208 may be any computer storage media.

The computing device 1202 includes computer-executable instructions 1210 that when executed on the computing device 1202 cause the computing device 1202 instantiate a user profile on a transferable device and deactivate one or more visually interactive applications on the transferable device upon receiving a deactivation cue contingent on a discrete probability calculation in accordance with the user profile. As referenced above and as shown in FIG. 12, in some examples, the computing device 1202 may optionally be contained in whole or in part within the device 1204.

The computing device 1202 includes computer-executable instructions 1220 that when executed on the computing device 1202 cause the computing device 1202 circuitry to perform transmitting via a computing device to a transferable device one or more instructions to deactivate one or more applications operating on the transferable device in accordance with a user profile, the one or more instructions contingently transmitted based on a determination that the transferable device has exceeded a maximum velocity and perform receiving a confirmation from the transferable device that the one or more applications have been deactivated. As referenced above and as shown in FIG. 12, in some examples, the computing device 1202 may optionally be contained in whole or in part within the device 1204.

In FIG. 12, the system 1200 includes at least one computing device (e.g., 1202 and/or 1204). The computer-executable instructions 1210 may be executed on one or more of the at least one computing device. For example, the computing device 1202 may implement the computer-executable instructions 1210 and output a result to (and/or receive data from) the computing device 1202. Since the computing device 1202 may be wholly or partially contained within the device 1204, the device 1204 also may be said to execute some or all of the computer-executable instructions 1210, in order to be caused to perform or implement, for example, various ones of the techniques described herein, or other techniques.

The device 1202 may include, for example, a personal digital assistant (PDA), a personal entertainment device, a mobile phone, a laptop computer, a tablet personal computer, a networked computer, a computing system comprised of a cluster of processors, a computing system comprised of a cluster of servers, a workstation computer, or a desktop computer. In another example embodiment, the computing device 1202 is operable to communicate with the device 1204 associated with the user 101 to receive information about the input from the user 101 for performing data access and data processing and presenting an output.

Further, the device 1202 may include a heterogeneous computing network including two or more of a personal digital assistant (PDA), a personal entertainment device, a mobile phone, a laptop computer, a tablet personal computer, a networked computer, a computing system comprised of a cluster of processors, a computing system comprised of a cluster of servers, a workstation computer, or a desktop computer, operably coupled to a common computing network.

Although a user 101 is shown/described herein as a single illustrated figure, those skilled in the art will appreciate that a user 101 may be representative of a human user, a robotic user (e.g., computational entity), and/or substantially any combination thereof (e.g., a user may be assisted by one or more robotic agents). In addition, a user 101, as set forth herein, although shown as a single entity may in fact be composed of two or more entities. Those skilled in the art will appreciate that, in general, the same may be said of "sender" and/or other entity-oriented terms as such terms are used herein.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.).

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies.

What is claimed is:

1. A mobile device tangibly embodying a program of instructions executable by the mobile device to perform a method, the method comprising:
    instantiating a user profile that at least causes two or more visually interactive applications to operate on the mobile device;
    deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application; and
    reactivating the at least one of the two or more visually interactive applications on the mobile device automatically based on a probability calculated by the mobile device that the mobile device is no longer exceeding the maximum velocity.

2. The mobile device of claim 1, wherein the instantiating a user profile that at least causes two or more visually interactive applications to operate on the mobile device comprises:
    instantiating a program of instructions organized as a user profile.

3. The mobile device of claim 1, wherein the instantiating a user profile that at least causes two or more visually interactive applications to operate on the mobile device comprises:
    instantiating the user profile via a network initiated instruction to activate the user profile.

4. The mobile device of claim 1, wherein the instantiating a user profile that at least causes two or more visually interactive applications to operate on the mobile device comprises:
    instantiating the user profile by a user of the mobile device.

5. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
    receiving the deactivation cue automatically as a function of a determination that the mobile device is in motion, the probability calculation associated with the determination that the mobile device is in motion.

6. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
    receiving the deactivation cue upon a determination based on the probability calculation that the mobile device is in motion, wherein the probability calculation is performed at the mobile device using a global positioning triangulation measurement performed at a predetermined frequency to predict a relative velocity of the mobile device.

7. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
    receiving the deactivation cue from a network interface based on a probabilistic function that includes a current location of the mobile device, a prior location of the mobile device, a time component between location determinations, and a maximum allowed speed as determined from the user profile.

8. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
    deactivating a visually interactive application wherein the visually interactive application includes a texting application.

9. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
    deactivating a visually interactive application wherein the visually interactive application includes an email application.

10. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
    deactivating a visually interactive application wherein the visually interactive application includes an instant messaging application.

11. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:

deactivating a visually interactive application wherein the visually interactive application includes a video messaging application.

12. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
deactivating a visually interactive application wherein the visually interactive application includes a real-time gaming application.

13. The mobile device of claim 1, wherein the deactivating at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application comprises:
deactivating a visually interactive application wherein the visually interactive application includes an interactive internet-based role playing application.

14. The mobile device of claim 1, wherein the probability calculation determines at least a current velocity.

15. The mobile device of claim 1, wherein the probability calculation determines at least an average velocity.

16. The mobile device of claim 1, wherein the probability calculation determines at least an instant velocity.

17. The mobile device of claim 16, wherein the instant velocity is determined using at least a derivative.

18. The mobile device of claim 1, wherein actual velocity data is received from a communications module.

19. The mobile device of claim 1, wherein the mobile device comprises a GPS.

20. The mobile device of claim 1, wherein a velocity metric is associated with the user profile.

21. The mobile device of claim 1, wherein a user interface is a visually interactive application.

22. The mobile device of claim 21, wherein a user interface includes one or more of a display screen, a touch screen, a keypad, a speaker system and a microphone.

23. A method comprising:
transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application; and
receiving a confirmation from the mobile device that the at least one of two or more applications has been deactivated,
wherein the transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
associating an activation cue with the mobile device to reactivate the at least one of two or more applications automatically independent of transmission from the computing device, the activation cue instantiating one or more instructions on the mobile device based on a probability calculated by the mobile device that the mobile device is no longer exceeding the maximum velocity.

24. The method of claim 23, wherein the transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
transmitting the one or more instructions after a periodic geolocation calculation determines that a probability that the mobile device has exceeded the maximum velocity is greater than a predetermined probability.

25. The method of claim 23, wherein the transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
transmitting via the computing device to at least a second mobile device one or more instructions associated with one or more of an instant message, a text message or an email message that the mobile device has been deactivated.

26. The method of claim 23, wherein the transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
transmitting to the mobile device one or more instructions that provide to a user of the mobile device an indication that the at least one of two or more applications operating on the mobile device has been deactivated.

27. The method of claim 23, wherein the receiving a confirmation from the mobile device that the at least one of two or more applications has been deactivated comprises:
receiving a network generated list of active applications running on the mobile device.

28. The method of claim 23, wherein the receiving a confirmation from the mobile device that the at least one of two or more applications has been deactivated comprises:
  receiving an acknowledgment message from the mobile device that the one or more instructions have been received and instantiated on the mobile device.

29. The method of claim 23, wherein the receiving a confirmation from the mobile device that the at least one of two or more applications has been deactivated comprises:
  receiving an acknowledgement of an end transmission from a network associated with the at least one of two or more applications.

30. The method of claim 23, wherein the receiving a confirmation from the mobile device that the at least one of two or more applications has been deactivated comprises:
  receiving an automatically generated confirmation from the mobile device.

31. The method of claim 23, wherein the receiving a confirmation from the mobile device that the at least one of two or more applications has been deactivated comprises:
  receiving the confirmation as an interruption code generated at a cellular switch.

32. The method of claim 23, comprising:
  querying the mobile device to confirm a transit status.

33. The method of claim 32, wherein the querying the mobile device to confirm a transit status comprises:
  querying the mobile device via a network message to the mobile device to confirm that the mobile device has one or more applications disabled.

34. The method of claim 23, comprising:
  transmitting to the mobile device a time-out message indicating that one or more applications will be disabled within a predetermined time period.

35. The method of claim 34, wherein the transmitting to the mobile device a time-out message indicating that one or more applications will be disabled within a predetermined time period comprises:
  transmitting to the mobile device a time-out message indicating that one or more applications will be disabled within a predetermined time period according to a user profile determined time period.

36. The method of claim 35, wherein the transmitting to the mobile device a time-out message indicating that one or more applications will be disabled within a predetermined time period according to a user profile determined time period comprises:
  transmitting a signal to the mobile device that the user profile predetermined time period has expired.

37. The method of claim 35, wherein the transmitting to the mobile device a time-out message indicating that one or more applications will be disabled within a predetermined time period according to a user profile determined time period comprises:
  enabling a user of the mobile device to extend the predetermined time period by entering a predetermined code.

38. The method of claim 23, comprising:
  deactivating one or more applications based on the user profile wherein the user profile establishes a metric for each application to determine a velocity of the mobile device appropriate for deactivation.

39. The method of claim 23, wherein the two or more applications comprises at least one visually interactive application.

40. A system comprising:
  means for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application; and
  means for receiving a confirmation from the mobile device that the at least one of two or more applications has been deactivated,
  wherein the means for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
    means for associating an activation cue with the mobile device to reactivate the at least one of two or more applications automatically independent of transmission from the computing device, the activation cue instantiating one or more instructions on the mobile device based on a probability calculated by the mobile device that the mobile device is no longer exceeding the maximum velocity.

41. The system of claim 40, wherein the means for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
  means for transmitting the one or more instructions after a periodic geolocation calculation determines that a probability that the mobile device has exceeded the maximum velocity is greater than a predetermined probability.

42. The system of claim 40, wherein the means for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
  means for transmitting via the computing device to at least a second mobile device one or more instructions associated with one or more of an instant message, a text message or an email message that the mobile device has been deactivated.

43. The system of claim 40, wherein the means for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
    means for transmitting to the mobile device one or more instructions that provide to a user of the mobile device an indication that the at least one of two or more applications operating on the mobile device has been deactivated.

44. The system of claim 40, wherein the means for receiving a confirmation from the mobile device that the at least one of two or more applications has been deactivated comprises:
    means for receiving an automatically generated confirmation from the mobile device.

45. The system of claim 40, wherein the means for receiving a confirmation from the mobile device that the at least one of two or more applications has been deactivated comprises:
    means for receiving the confirmation as an interruption code generated at a cellular switch.

46. The system of claim 40, comprising:
    means for querying the mobile device to confirm a transit status.

47. The system of claim 46, wherein the means for querying the mobile device to confirm a transit status comprises:
    means for querying the mobile device via a network message to the mobile device to confirm that the mobile device has one or more applications disabled.

48. The system of claim 40, comprising:
    means for transmitting to the mobile device a time-out message indicating that one or more applications will be disabled within a predetermined time period.

49. The system of claim 48, wherein the means for transmitting to the mobile device a time-out message indicating that one or more applications will be disabled within a predetermined time period comprises:
    means for transmitting to the mobile device a time-out message indicating that one or more applications will be disabled within a predetermined time period according to a user profile determined time period.

50. The system of claim 49, wherein the means for transmitting to the mobile device a time-out message indicating that one or more applications will be disabled within a predetermined time period according to a user profile determined time period comprises:
    means for transmitting a signal to the mobile device that the user profile predetermined time period has expired.

51. The system of claim 49, wherein the means for transmitting to the mobile device a time-out message indicating that one or more applications will be disabled within a predetermined time period according to a user profile determined time period comprises:
    means for enabling a user of the mobile device to extend the predetermined time period by entering a predetermined code.

52. The system of claim 40, comprising:
    means for instantiating a user profile.

53. The system of claim 52, wherein the means for instantiating a user profile comprises:
    means for determining that a velocity metric has been exceeded for at least one application.

54. A system comprising:
    circuitry for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application; and
    circuitry for receiving a confirmation from the mobile device that the at least one of two or more applications has been deactivated,
    wherein the circuitry for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:
    circuitry for associating an activation cue with the mobile device to reactivate the at least one of two or more applications automatically independent of transmission from the computing device, the activation cue instantiating one or more instructions on the mobile device based on a probability calculated by the mobile device that the mobile device is no longer exceeding the maximum velocity.

55. The system of claim 54, comprising:
circuitry operable for querying the mobile device to confirm a transit status.

56. The system of claim 54, comprising:
circuitry operable for transmitting to the mobile device a time-out message indicating that one or more applications will be disabled within a predetermined time period.

57. A computer program product comprising:
one more non-transitory computer readable mediums bearing:
    one or more instructions for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application; and
    one or more instructions for receiving a confirmation from the mobile device that the at least one of two or more applications has been deactivated,
    wherein the one or more instructions for transmitting via a computing device to a mobile device one or more instructions to deactivate at least one of two or more applications operating on the mobile device, the one or more instructions contingently transmitted based on a probability calculation by the mobile device that the mobile device has exceeded a maximum velocity for the at least one of two or more applications operating on the mobile device based on a velocity metric, wherein each of the two or more applications is associated with a velocity metric that activates the associated application comprises:

one or more instructions for associating an activation cue with the mobile device to reactivate the at least one of two or more applications automatically independent of transmission from the computing device, the activation cue instantiating one or more instructions on the mobile device based on a probability calculated by the mobile device that the mobile device is no longer exceeding the maximum velocity.

58. A system comprising:
one or more computing devices; and
one or more instructions that when executed on the one or more computing devices cause the one or more computing devices to:
    instantiate a user profile that at least causes two or more visually interactive applications to operate on a mobile device;
    deactivate at least one of the two or more visually interactive applications on the mobile device upon receiving a deactivation cue contingent on a probability calculation by the mobile device that the mobile device is exceeding a maximum velocity for the at least one of the two or more visually interactive applications based on a velocity metric, wherein each of the two or more visually interactive applications is associated with a velocity metric that activates the associated application; and
    reactivate the at least one of the two or more visually interactive applications on the mobile device automatically based on a probability calculated by the mobile device that the mobile device is no longer exceeding the maximum velocity.

59. The system of claim 58, wherein the one or more computing devices comprise:
    one or more heterogeneous computing networks.

\* \* \* \* \*